(12) United States Patent
Doerry et al.

(10) Patent No.: US 9,645,227 B1
(45) Date of Patent: May 9, 2017

(54) WAVEFORM FREQUENCY NOTCHING

(71) Applicants: Sandia Corporation, Albuquerque, NM (US); John Andrews, La Jolla, CA (US)

(72) Inventors: Armin W. Doerry, Albuquerque, NM (US); John Andrews, La Jolla, CA (US)

(73) Assignee: Sandia Corporation, Albuquerque, NM (US)

( * ) Notice: Subject to any disclaimer, the term of this patent is extended or adjusted under 35 U.S.C. 154(b) by 322 days.

(21) Appl. No.: 14/548,676

(22) Filed: Nov. 20, 2014

(51) Int. Cl.
*G01S 7/36* (2006.01)
*G01S 7/02* (2006.01)

(52) U.S. Cl.
CPC .................. *G01S 7/023* (2013.01)

(58) Field of Classification Search
CPC ........................................... G01S 7/023
USPC .................... 342/16–18, 200–204
See application file for complete search history.

(56) References Cited

U.S. PATENT DOCUMENTS

| | | | | |
|---|---|---|---|---|
| 5,337,056 A * | 8/1994 | Dax | ........................ | G01S 7/486 342/128 |
| 5,469,479 A * | 11/1995 | Chang | ..................... | G01S 7/282 342/201 |
| 5,852,418 A * | 12/1998 | Ferrell | ................. | G01S 13/282 342/101 |
| 6,091,356 A * | 7/2000 | Sanders | .................. | G01S 7/282 331/1 R |
| 6,970,717 B2 * | 11/2005 | Behrens | ............... | H04B 1/0003 455/313 |
| 2004/0042539 A1 * | 3/2004 | Vishakhadatta | ..... | H04B 1/0003 375/216 |
| 2008/0074311 A1 * | 3/2008 | Atherton | ................. | G01S 7/282 342/202 |
| 2008/0089392 A1 * | 4/2008 | Anglin | .................... | H04B 1/69 375/139 |
| 2008/0309547 A1 * | 12/2008 | Michalski | ............. | G01F 23/284 342/137 |

(Continued)

OTHER PUBLICATIONS

I. W. Selesnick and S. U. Pillai, "Chirp-like transmit waveforms with multiple frequency-notches," 2011 IEEE RadarCon (RADAR), Kansas City, MO, 2011, pp. 1106-1110.*

(Continued)

*Primary Examiner* — Marcus Windrich
(74) *Attorney, Agent, or Firm* — Medley, Behrens & Lewis, LLC

(57) ABSTRACT

The various technologies presented herein relate to incorporating one or more notches into a radar spectrum, whereby the notches relate to one or more frequencies for which no radar transmission is to occur. An instantaneous frequency is monitored and if the frequency is determined to be of a restricted frequency, then a radar signal can be modified. Modification can include replacing the signal with a signal having a different instantaneous amplitude, a different instantaneous phase, etc. The modification can occur in a WFS prior to a DAC, as well as prior to a sin ROM component and/or a cos ROM component. Further, the notch can be dithered to enable formation of a deep notch. The notch can also undergo signal transitioning to enable formation of a deep notch. The restricted frequencies can be stored in a LUT against which an instantaneous frequency can be compared.

20 Claims, 13 Drawing Sheets

(56) References Cited

U.S. PATENT DOCUMENTS

| | | | | |
|---|---|---|---|---|
| 2009/0327620 | A1* | 12/2009 | Arsovski | G06F 13/4243 711/154 |
| 2011/0230157 | A1* | 9/2011 | Zhou | H04B 1/26 455/326 |
| 2013/0135141 | A1* | 5/2013 | Selesnick | G01S 7/023 342/202 |

OTHER PUBLICATIONS

Walker, et al., "A High-Resolution, Four-Band SAR Testbed with Real-Time Image Formation," Geoscience and Remote Sensing Symposium, IEEE, vol. 3, 1996, pp. 1881-1885.
Wells, et al., "Developments in SAR and IFSAR Systems and Technologies at Sandia National Laboratories," IEEE Aerospace Conference, vol. 2, 2003, pp. 1085-1095.
Doerry, et al., "Digital Signal Processing Applications in High-Performance Synthetic Aperture Radar Processing," 37th Asilomar Conference on Signals, Systems and Computers, Nov. 9, 2003, pp. 1-3.
Wells, et al., "Synthetic Aperture Radar: Not Just a Sensor of Last Resort," SPIE AeroSense, vol. 5109, 2003, 12 pages.
Sloan, et al., "Affordable, Miniaturized SAR for Tactical UAV Applications," Defense and Security, International Society for Optics and Photonics, 2004, 10 pages.
Doerry, A. W., "Generating Precision Nonlinear FM Chirp Waveforms," Defense and Security, SPIE, vol. 6547, 2007, pp. 1-12.
Doerry, et al., "Compound Radar Waveforms with Multiple Frames," Defense, Security and Sensing Symposium, SPIE, vol. 8714, 2013, pp. 1-14.
Doerry, et al., "Random-Phase Radar Waveforms with Shaped Spectrum," Defense, Security and Sensing Symposium, SPIE, vol. 8714, 2013, pp. 1-13.
Doerry, et al., "Digital Synthesis of Linear-FM Chirp Waveforms—Comments on Performance and Enhancements," Defense and Security Symposium, SPIE, vol. 9077, 2014, pp. 1-12.
Doerry, A. W., "Generating Nonlinear FM Chirp Waveforms for Radar," Sandia Report, SAND2006-5856, Sep. 2006, 34 pages.
Doerry, et al., "Shaping the Spectrum of Random-Phase Radar Waveforms," Sandia Report, SAND2012-6915, Sep. 2012, 58 pages.
Doerry, et al., "Compound Multi-Frame Radar Waveforms," Sandia Report, SAND2012-6965, Sep. 2012, 70 pages.
Doerry, et al., "Frequency-Dependent Blanking with Digital Linear Chirp Waveform Synthesis," Sandia Report, SAND2014-15907, Jul. 2014, 28 pages.

\* cited by examiner

WAVEFORM FREQUENCY NOTCHING

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Radar technologies can utilize pulse modulation to achieve wide bandwidths for fine range resolution in conjunction with long pulses duration to enhance pulse energy and hence enhance signal to noise ratio (SNR) for both transmitted and received signals.

To achieve finer signal resolutions, radar signal technologies are being developed that utilize ever larger bandwidths. Radar frequency bands are chosen to facilitate some advantage to an immediate mission, such as foliage or ground penetration at the lower frequencies (e.g., ultra high frequency (UHF), very high frequency (VHF), and lower) through to long-range operation in adverse weather at lower microwave frequencies, to ultra-fine resolutions and narrow antenna beams at frequencies corresponding to a millimeter wavelength.

As the necessary operational bandwidth increases, particularly at the lower frequencies, a radar signal may have to compete with other spectrum users for any required frequency bands and sub-bands. Such competition can be manifested as interference, whereby a radar system can act as both an offender and a victim, depending on the nature of the interference.

Regulatory limits can be in place to prohibit a radar system from transmitting in one or more specific spectral regions, which in turn can limit operation of the radar system.

SUMMARY

The following is a brief summary of subject matter that is described in greater detail herein. This summary is not intended to be limiting as to the scope of the claims.

A plurality of embodiments are presented herein relating to generation of a notched chirp signal for a radar application, e.g., a linear frequency modulated (LFM) chirp. In an embodiment, a circuit can include, or have access to, a programmable look-up table (LUT), whereby the LUT can include one or more frequency bands over which transmission is forbidden or restricted. In conjunction with the LUT, an instantaneous chirp frequency (a frequency over which energy is to be transmitted in a chirp at an instantaneous point in time) can be monitored to determine whether the instantaneous frequency is included in a frequency band in the list of forbidden frequency bands, and accordingly, an indication can be generated with regard to whether the instantaneous frequency is either passed unmodified or undergoes a notching operation owing to being forbidden.

In response to determining that the instantaneous frequency is to be passed, then a phase for the instantaneous frequency can be passed to a sin ROM component for conversion to a desired waveform instantaneous amplitude. In an embodiment, the sin ROM component can convert the phase of the instantaneous frequency to an instantaneous amplitude of a sinusoid.

In response to determining that the instantaneous frequency is to be notched from the chirp, a signal path across the circuit can be interrupted in at least one of the following locations:

(i) at the output of the sin ROM component, the amplitude word that is applied to a DAC can be substituted with another that causes a zero signal level at the output of the DAC, thereby disabling the waveform for a duration that the chirp would otherwise transmit energy over the frequencies of the notch.

(ii) at the input to the sin ROM component, the phase (e.g., a first phase or an original phase) of the instantaneous frequency can be substituted with another phase (e.g., a second phase) such that the sin ROM component selects a phase that causes the instantaneous output of the DAC to go to a zero signal level, thereby disabling the waveform for the duration that the chirp would otherwise transmit energy over the frequencies of the notch.

To preserve phase linearity across the notch, an LFM chirp generator component that is configured to generate the chirp can continue to update in the background, generally unaware whether its output is being passed to the sin ROM and/or ultimately to the DAC or not.

Furthermore, in an embodiment, the depth of the notch can be significantly improved (e.g., in a statistical sense) by randomly modulating the spectral location of the transitions between frequencies that are to be included in the chirp and a notch.

In another embodiment, the notch may be implemented with a controlled gradual transition between 'on' and 'off' to similarly control notch depth.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
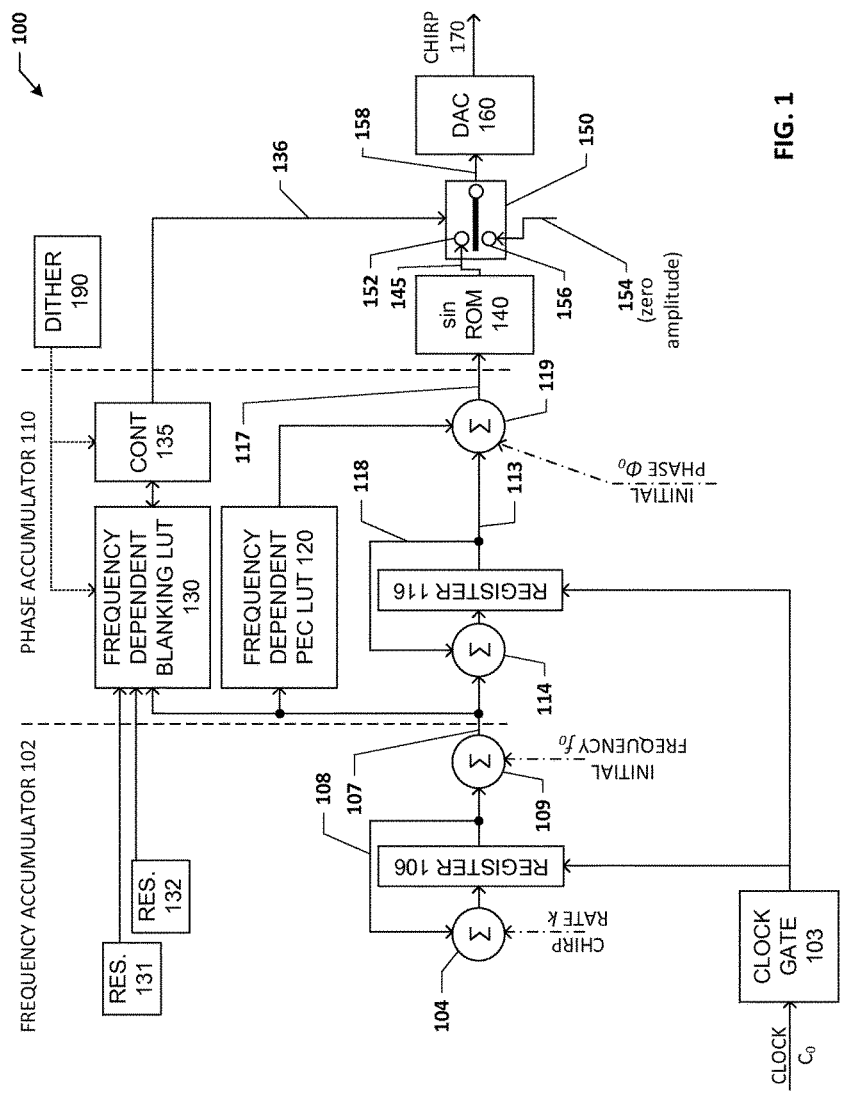
FIG. 1 illustrates a system for notching a frequency spectrum, according to an embodiment.

Various technologies pertaining to generating one of more frequency notches in a radar waveform are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As previously mentioned, radar systems may be restricted from transmitting within or across specific frequency bands in order to prevent interference with other spectrum users. The various embodiments presented herein relate to notching a transmitted spectrum of a generated and transmitted radar waveform. The one or more notches are fully programmable as to their location within a waveform and other characteristics that can be controlled. In an aspect, the one or more notches can be programmed such that they coincide with one or more frequency ranges where radar signaling and transmission is restricted.

As noted above, effecting a notch in a radar signal prior to conversion of the radar signal from a digital form to an analog form can be advantageous. With a conventional system, disabling the output of a waveform synthesizer (WFS) can be accomplished by either switching off the signal path downstream from the WFS signal generator, or by disabling the DAC in some manner. However, such an approach is undesirable because switching speeds for the required components becomes problematic.

Accordingly, the various embodiments presented herein enable one or more frequency notches to be programmed during a LFM chirp waveform generation process within a WFS itself. Furthermore, switching speed issues can be avoided by in turn avoiding any external (to the WFS) signal switching, or disabling the DAC. Also, the various embodiments enable a waveform to be generated that preserves phase linearity outside of a "notched" region of the waveform.

The various embodiments are applicable to any frequency and/or frequency range utilized to generate a signal waveform. As previously mentioned, frequency competition can occur with other spectrum users over any frequency band(s) and/or sub-band(s). In particular, frequency competition may be pronounced at the lower frequencies such as UHF (e.g., 300 MHz to 3 GHz), VHF (30 MHz to 300 MHz), microwave frequencies, and frequencies corresponding to millimeter wavelength and lower.

FIG. 1 illustrates a system 100, whereby system 100 can be a WFS circuit configured to synthesize a desired waveform, such as a chirp, (e.g., a LFM chirp). As described further herein, system 100 can be configured to generate one or more notches in the chirp, whereby the one or more notches correlate to one or more frequencies for which signaling (e.g., radar signaling) is not to occur, e.g., a frequency is forbidden, restricted, etc. In an embodiment, system 100 can be utilized to generate a single-ended WFS.

System 100 utilizes a pair of accumulators, a frequency accumulator component 102 and a phase accumulator component 110, in conjunction with a frequency dependent phase error correction lookup table (PEC LUT) 120, a frequency dependent blanking look up table (LUT) 130, a sin read only memory (ROM) component 140, a switch 150, and a DAC 160 to facilitate generation of a chirp 170 (e.g., a chirp having an analog format).

The frequency accumulator component 102 can include a first adder component 104 operating in series with a register component 106, a feedback loop 108 from an output of register component 106 to the input of adder component 104, and a second adder component 109.

At an initial state of operation of system 100, the register 106 can be initialized (e.g., reset) with a zero value, or "empty". A clock gate 103 can be initialized (e.g., at the start of generation of a desired waveform) whereby a chirp rate constant k can be loaded into the adder component 104, which via the feedback loop 108, the chirp rate k can be recursively added to generate an accumulated chirp rate k operating at the register component 106. The frequency accumulator component 102 can accumulate, or integrate, the chirp rate constant, k, whereby the value accumulated (e.g., $k_i$) at the register 106 is a frequency offset indication. The accumulated $k_i$ can be added to a programmed initial frequency $f_0$ (which has been loaded into the adder component 109) to facilitate provision of an output $f(t)=f_0+kt$, an instantaneous frequency 107. For a LFM chirp, the signal is a sweep of frequencies over time. Accordingly, the instantaneous frequency 107 is a frequency over which energy is to be transmitted at an instantaneous point in time.

In an embodiment, the instantaneous frequency 107 can subsequently be applied to the phase accumulator component 110. The phase accumulator component 110 can include a third adder component 114 operating in series with the second register component 116, a feedback loop 118 from an output of register component 116 to the input of adder component 114, and a fourth adder component 119. In an embodiment, the phase accumulator component 110 can receive the instantaneous frequency 107 output by adder component 109. The instantaneous frequency 107 term can be integrated (e.g., via adder component 114, feedback loop 118 and register component 116) to provide an output 113. At the adder component 119, an initial phase $\phi_0$ can be applied to the output 113 to enable generation of an instantaneous phase $\phi(t)$ (e.g., output 117). Accordingly, with the generation of the instantaneous phase, the combination of frequency accumulator component 102 and the phase accumulator component 110 can be collectively known as a phase generator (PG), or a PG logic circuit.

The resulting instantaneous phase $\phi(t)$ can be loaded into the sin ROM component 140, whereby the sin ROM component 140 can be configured to convert the instantaneous phase $\phi(t)$ to an instantaneous amplitude. In an embodiment, the sin ROM component 140 can be a look-up table, an algorithm, etc. In a further embodiment, the sin ROM can include one cycle of a sine waveform. The output of the sin ROM component 140 can be forwarded to the DAC 160, whereby the forwarding can be via a switch 150 (as described further herein). At the DAC 160, the output from the sin ROM component 140 can be converted to provide an instantaneous analog signal for subsequent transmission by a radar system, e.g., a chirp 170. In an embodiment, the process enabled by the above described components can continue until a full pulse waveform is generated, at which time the clock and clock gate 103 can be disabled, and the process is repeated for the next pulse.

In a further embodiment, the instantaneous frequency 107 can be utilized to further modify at least one characteristic of an output signal. For example, the instantaneous frequency 107 can be utilized to implement a frequency dependent phase error correction to equalize a signaling operation being performed at the adder component 119 (e.g., to compensate for one or more nonlinearities in one or more radio frequency (RF) components incorporated into a radar system).

In another embodiment, the instantaneous frequency 107 can be compared with one or more frequencies stored in the frequency dependent blanking LUT 130. As previously mentioned, radar signaling and transmission can be restricted over certain frequencies. In an aspect, one or more restricted frequencies may occur within one or more desired frequency ranges of a waveform, and accordingly, transmission at the one or more frequencies is to be avoided. Any regions of transmission in a waveform that are to have zero transmission can be referred to as "blanked" or "notched". Accordingly, the frequency dependent blanking LUT 130 can be configured to include the one or more restricted frequencies (frequency bands). In an embodiment, the frequency dependent blanking LUT 130 can be preconfigured (or programmed) with one or more frequencies where no transmission is to occur. In an alternative embodiment, the frequency dependent blanking LUT 130 can be updated in real-time or near real-time in accordance with any frequency restrictions that are currently being encountered, or may be encountered in the future. For example, an aircraft which has system 100 operating onboard, may be flying from one airspace which has a first set of frequency restrictions (e.g., restrictions 131) into a second airspace that has a second set of flying restrictions (e.g., restrictions 132) and accordingly the frequency dependent blanking LUT 130 can be updated in accordance with the respective frequency restriction(s) currently in operation or to be encountered at some future time. Accordingly, notching of a waveform can be dynamic with regard to any given frequency restriction(s) currently in operation or to be encountered at some future time.

Owing to a chirp (e.g., an LFM chirp) being a sweep of frequencies with time, any instantaneous frequency will exist only once during generation and/or transmission of a chirp waveform. Accordingly, the frequency dependent blanking LUT 130 can be constructed in view of the single instance of an instantaneous frequency. It is to be further noted that during conversion by the sin ROM component 140 of the instantaneous phase to an instantaneous amplitude, there is at least one phase where the output amplitude is zero, i.e., sin(0)=0. In an aspect, the sin ROM component 140 can implement a trigonometric sin( ) function. As further described herein, when a cos ROM component (e.g., a cos ROM component 240) is utilized, the phase can be set to $\cos(\pi/2)=0$, with the cos ROM component implementing a trigonometric cos( ) function.

As illustrated in FIG. 1, the system 100 can include a switch 150 which can be utilized to enable the DAC 160 to be switched from the instantaneous amplitude signal 145 generated by the sin ROM component 140 on an input 152 to an amplitude signal 154 being received on an input 156. In an embodiment, the amplitude signal 154 received on input 156 can be a constant-amplitude input to be utilized for one or more frequencies defined for which a notch(es) is desired in a waveform, e.g., for the one or more frequencies defined in the frequency dependent blanking LUT 130. In an aspect, any constant amplitude signal can effect a notch being formed in a waveform, but a zero amplitude signal can avoid adding a DC bias to a signal 170 being outputted from DAC 160.

In an embodiment, a control component 135 can be connected to the frequency dependent blanking LUT 130. The control component 135 can monitor the instantaneous frequency 107 being received at the frequency dependent blanking LUT 130, and determine whether the instantaneous frequency 107 is a restricted frequency stored in the frequency dependent blanking LUT 130. In response to determining that the instantaneous frequency 107 is not a restricted frequency, the switch 150 can be controlled (e.g., by a first indicator in a signal 136 sent from the control component 135) to operate utilizing the instantaneous amplitude signal 145 at the input 152 (e.g., a first switch position), with the instantaneous amplitude signal 145 being passed through the switch 150, and output as signal 158, to be subsequently input into the DAC 160. Hence, with the switch 150 in the first switch position, a signal (e.g., the instantaneous amplitude signal 145) received at the switch input 152 can pass through the switch 150 unmodified.

Alternatively, in response to determining that the instantaneous frequency 107 is a restricted frequency listed in the frequency dependent blanking LUT 130, the switch 150 can be controlled to operate (e.g., by a second indicator in the signal 136 sent from the control component 135) utilizing an input 156 (e.g., a second switch position), with the amplitude signal 154 being passed through the switch 150, as signal 158, to be input into the DAC 160, and subsequently utilized in the formation of the chirp 170. Hence, with the switch 150 in the second position, a signal (e.g., the instantaneous amplitude signal 145) received at the switch input 152 can be replaced by an amplitude signal (e.g., signal 154 being a zero amplitude signal) received on the input 156.

In an embodiment, a dither component 190 can be incorporated into the system 100, and can be utilized to apply a dither to a notch width when a plurality of waveforms (e.g., a sequence or group of waveforms) are being generated. The dither component 190 can be communicatively coupled to the frequency dependent blanking LUT 130 and/or the controller 135. The dither component 190 can be programmed with at least one notch dither width, whereby a notch dither width can identify a range over which a dither operation is to occur. A notch dither width can be established based upon a sampling frequency of a waveform, as further described with reference to FIGS. 8, 9, and 15. The dither component 190 can operate in isolation, e.g., by identifying a notch transition in a waveform and dithering the frequency at which the notch transition will occur. Alternatively, the dither component 190 can operate based upon one or more forbidden frequencies defined in the frequency dependent blanking LUT 130, and adjust the frequency at which a notch transition can occur based upon the one or more forbidden frequencies. Accordingly, the dither component 190 can adjust a frequency at which the notch transition will occur at the switch 150.

Figure 2:
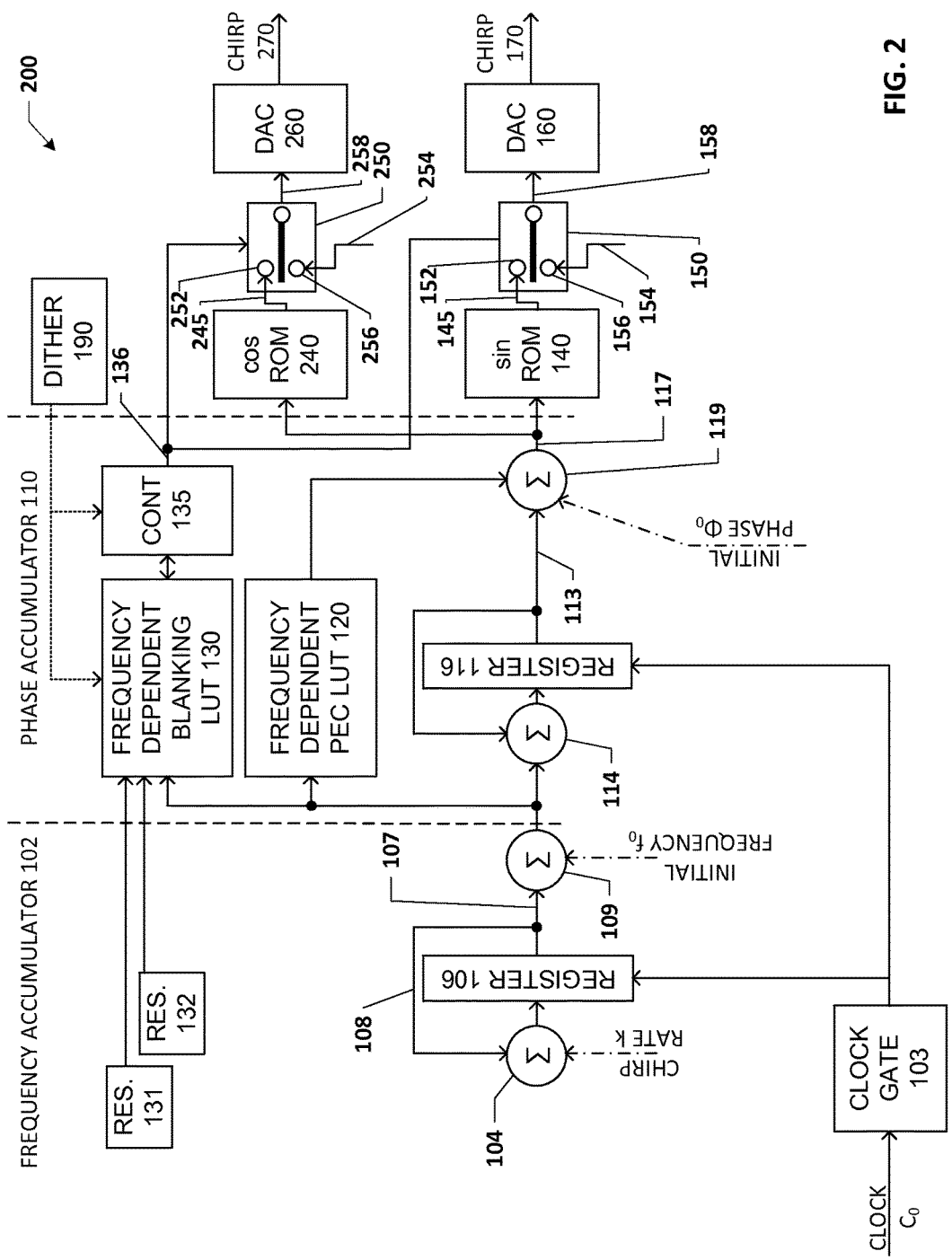
FIG. 2 illustrates a system for notching a frequency spectrum, according to an embodiment.

Turning to FIG. 2, system 200 is presented, whereby system 200 can be a WFS circuit configured to synthesize a desired waveform(s), such as one or more chirps 170 and/or 270, (e.g., a LFM chirp(s)). System 200 can be utilized to generate a quadrature WFS, whereby a quadrature WFS comprising the chirp 170 and/or chirp 270 can be utilized to provide one or more outputs for a single-sideband (SSB) mixer, for example. In an aspect, such a WFS is capable of double the signal bandwidth of a single-ended WFS (e.g., as generated by system 100). As described further herein, system 200 can be configured to generate one or more notches in one or both of chirps 170 and/or chirp 270, whereby the one or more notches correlate to one or more frequencies for which signaling (e.g., radar signaling) is not to occur. Chirp 170 can be a Q channel output and chirp 270 can be an I channel output.

System 200 includes comparable components to those included in system 100, and per the common labeling, the comparable components can function in a similar manner to that described with regard to system 100 above. However, owing to system 200 being utilized to generate a quadrature WFS, system 200 further includes a cos ROM component 240, which is connected to a second switch 250 and a second DAC 260. The second switch 250 operates in a manner similar to a first switch 150, and the second DAC 260 operates in a manner similar to a first DAC 160.

The control component 135 can monitor the instantaneous frequency 107 being received at the frequency dependent blanking LUT 130, and determine whether the instantaneous frequency 107 is a restricted frequency stored in the frequency dependent blanking LUT 130. In response to determining that the instantaneous frequency 107 is not a restricted frequency, the switch 250 can be controlled (e.g., by a signal 136 sent from the control component 135) to operate utilizing the input 252, with the instantaneous amplitude signal 245 generated by the cos ROM component 240 being passed through the switch 250, as signal 258, to be input into the DAC 260. Alternatively, in response to determining that the instantaneous frequency 107 is a restricted frequency listed in the frequency dependent blanking LUT 130, the switch 250 can be controlled (e.g., by the signal 136 sent from the control component 135) to operate utilizing the input 254, with the amplitude signal 254 being passed through the switch 250, as signal 258, to be input into the DAC 260, and subsequently utilized in the formation of the notch in chirp 270.

It is to be appreciated that while FIG. 2 illustrates a frequency dependent PEC LUT 120 being common to both the sin ROM component 140 input channel and the cos ROM component 240 input channel, separate frequency dependent PEC LUT's can be utilized, whereby one for each of the respective input channels would enable correction of differential channel errors, particularly such errors that can be manifest when operating SSB analog mixers.

Figure 8:
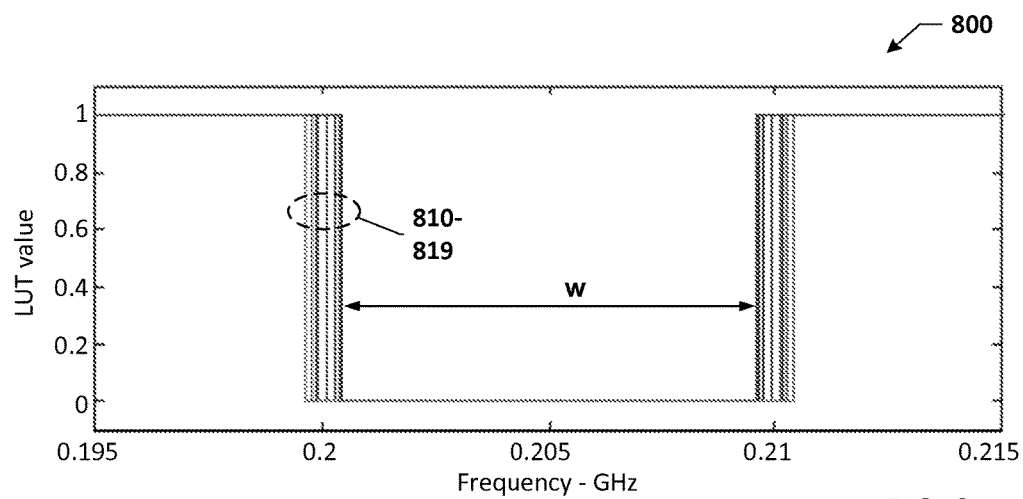
FIG. 8 is an overlay of 10 pulses indicating dithered location of spectral notches for each pulse, according to an embodiment.

In an embodiment, one or more dither components 190 can be incorporated into the system 200, and can be utilized to apply a dither to a notch width when a plurality of waveforms are being generated, as previously described with reference to system 100, and as further described with reference to FIGS. 8, 9, and 15.

Figure 3:
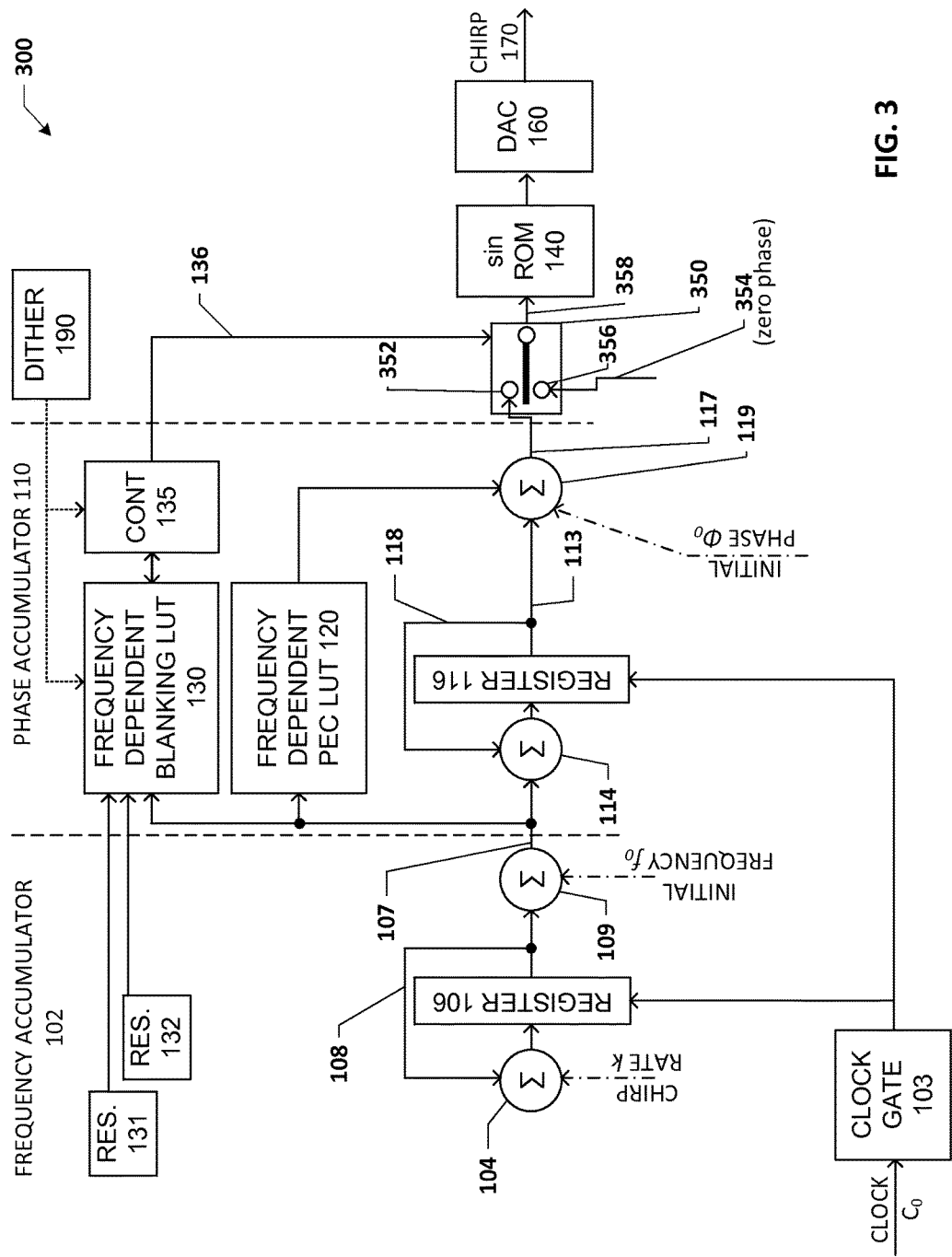
FIG. 3 illustrates a system for notching a frequency spectrum, according to an embodiment.

FIG. 3 illustrates a system 300, whereby system 300 can be a WFS circuit configured to synthesize a desired waveform, such as a chirp, (e.g., a LFM chirp). As described further herein, system 300 can be configured to generate one or more notches in the chirp, whereby the one or more notches correlate to one or more frequencies for which signaling (e.g., radar signaling) is not to occur. The system 300 can be utilized to generate a single-ended WFS.

System 300 includes comparable components to those included in system 100, and per the common labeling, the common components can function in a similar manner to that described with regard to system 100 above. However, system 300 operates by switching an input to the sin ROM component 140, and accordingly, in comparison with system 100, a switch 350 can be located in the system 300 prior to the sin ROM component 140. In contrast, for the system 100, the switch 150 is located after the sin ROM component 140. Further, while the switch 150 of system 100 operates to apply an amplitude signal, switch 350 can operate with a constant phase (e.g., a zero phase) being utilized to generate a notch in a waveform.

In an embodiment, a switch control component 135 can be connected to the frequency dependent blanking LUT 130. The switch control component 135 can monitor the instantaneous frequency 107 being received at the frequency dependent blanking LUT 130, and determine whether the instantaneous frequency 107 is a restricted frequency stored in the frequency dependent blanking LUT 130. In response to determining that the instantaneous frequency 107 is not a restricted frequency, the switch 350 can be controlled (e.g., by a signal 136 sent from the control component 135) to operate with the switch 350 utilizing the instantaneous phase signal 117 received at input 352, with the instantaneous phase signal 117 being passed to the sin ROM component 140 as output 358, and subsequently to be utilized as an input into the DAC 160. Alternatively, in response to determining that the instantaneous frequency 107 is a restricted frequency listed in the frequency dependent blanking LUT 130, the switch 350 can be controlled (e.g., by the signal 136 sent from the control component 135) to operate utilizing the input 356, with the phase signal 354 being passed through the switch 350, as signal 358, to be input into the sin ROM component 140 and accordingly into the DAC 160, to subsequently form the chirp 170.

In an embodiment, a dither component 190 can be incorporated into the system 300, and can be utilized to apply a dither to a notch width when a plurality of waveforms are being generated, as previously described with reference to system 100, and as further described with reference to FIGS. 8, 9, and 15.

Figure 4:
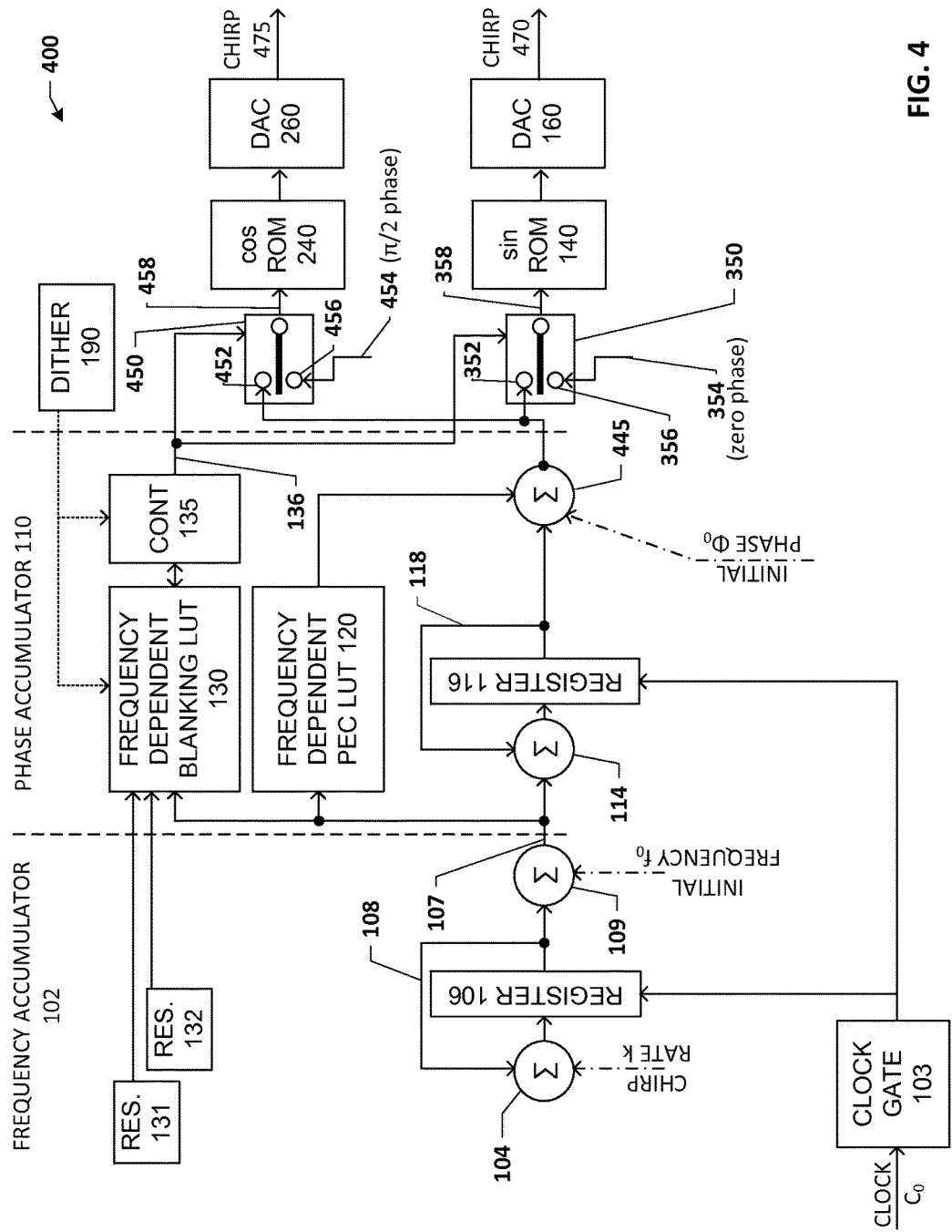
FIG. 4 illustrates a system for notching a frequency spectrum, according to an embodiment.

Turning to FIG. 4, system 400 is presented, whereby system 400 can be a WFS circuit configured to synthesize a desired waveform(s), such as one or more chirps 470 and/or 475, (e.g., LFM chirps). System 400 can be utilized to generate a quadrature WFS, whereby a quadrature WFS comprising the chirp 470 and/or chirp 475 can be utilized to provide one or more outputs for a single-sideband (SSB) mixer, for example. In an aspects, such a WFS is capable of double the signal bandwidth of a single-ended WFS (e.g., as generated by system 300). As described further herein, system 400 can be configured to generate one or more notches in a respective chirp (e.g., chirp 470 and/or analog chirp 475), whereby the one or more notches correlate to one or more frequencies for which signaling (e.g., radar signaling) is not to occur. Chirp 470 can be a Q channel output and chirp 475 can be an I channel output.

System 400 includes comparable components to those included in system 300, and per the common labeling function in a similar manner to that described with regard to system 300 above. However, owing to system 400 being utilized to generate a quadrature WFS, system 400 further includes a cos ROM component 240, which is connected to a second switch 450 and a second DAC 260. The second switch 450 operates in a manner similar to the first switch 350, and the second DAC 260 operates in a manner similar to a first DAC 160. The switch control component 135 can monitor the instantaneous frequency 107 being received at the frequency dependent blanking LUT 130, and determine whether the instantaneous frequency 107 is a restricted frequency stored in the frequency dependent blanking LUT 130. In response to determining that the instantaneous frequency 107 is not a restricted frequency, the control component 135 can control (e.g., with control signal 136) to operate the switch 450 to utilize the input 452, with the instantaneous phase signal 452 generated by adder component 445 being passed unmodified through the switch 450 to form output signal 458 at output 450. The signal 458 can be input into the cos ROM component 240 to form a signal to be input into the DAC 260, and ultimately form chirp 475.

Alternatively, in response to the control component 135 determining that the instantaneous frequency 107 is a restricted frequency listed in the frequency dependent blanking LUT 130, the switch 450 can be controlled (e.g., by the signal 136 sent from the control component 135) to operate utilizing the input 456, with a π/2 phase signal 454 being passed through the switch 450, as signal 458, to be input into the cos ROM component 240 to form a signal to be input into the DAC 260, and ultimately form a notch in chirp 475.

In an embodiment, one or more dither components 190 can be incorporated into the system 400, and can be utilized to apply a dither to a notch width when a plurality of waveforms are being generated, as previously described with reference to system 100, and as further described with reference to FIGS. 8, 9, and 15.

To facilitate understanding of the systems 100-400, and their respective application, the following examples are provided, whereby:
 WFS sampling frequency range=1 gigahertz (GHz)
 Waveform pulsewidth=100 microseconds (μs)
 Waveform center frequency=250 megahertz (MHz)
 LFM chirp bandwidth=250 MHz
and furthermore, the following are restricted frequencies and accordingly, notches are desired in a waveform(s):
 at a first frequency range of 150 MHz to 170 MHz, and
 at a second frequency range of 200 MHz to 210 MHz.

Accordingly, the first frequency range and the second frequency range values can be entered into the frequency dependent blanking LUT 130, as utilized in systems 100-400 (e.g., The first frequency range values and the second frequency range values can be utilized by the control component 135 to determine whether a respective switch (e.g., by restriction 131 and/or restriction 132) any of switches 150, 350, and/or 450) is to be switched to a respective constant amplitude signal or a constant phase signal, as previously described. The following description is presented with regard to the system 400, however, it is to be appreciated that the aspects described below with regard to quadrature phase-switching are equally applicable to the amplitude and phase switching embodiments presented in systems 100-300.

Figure 5:
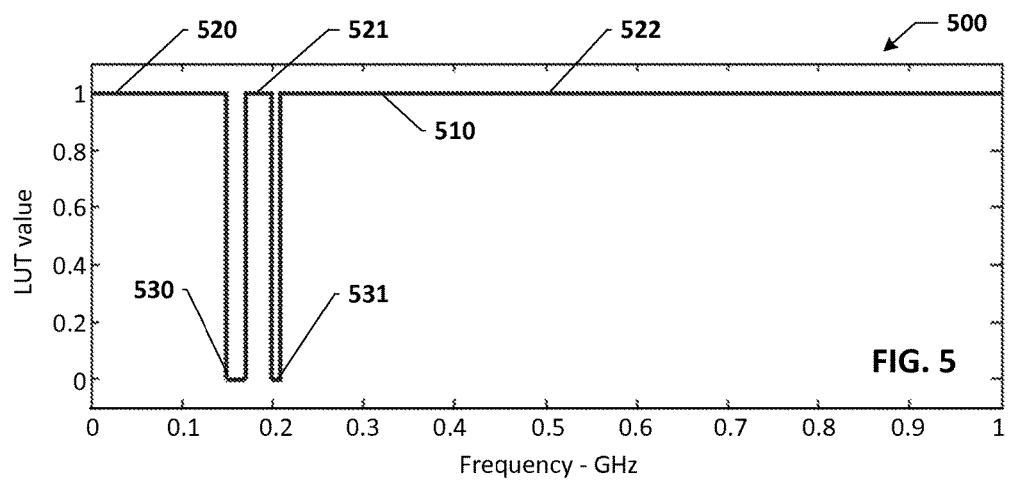
FIG. 5 is a plot of blanking look up table values as a function of frequency, according to an embodiment.

FIG. 5 illustrates a graph 500 of the blanking LUT values with respect to a sampling frequency range, per the foregoing example values. In an embodiment, as shown by the plot 510, a LUT value of 1 can be stored in the frequency dependent blanking LUT 130 for the frequencies which are not restricted, e.g., frequencies in the ranges indicated 520, 521, and 522. Further, a LUT value of 0 can be stored in the frequency dependent blanking LUT 130 for the frequencies which are restricted, e.g., frequencies in the ranges indicated 530 (e.g., the first frequency range of 150 to 170 MHz) and 531 (e.g., the second frequency range of 200 to 210 MHz).

Figure 6:
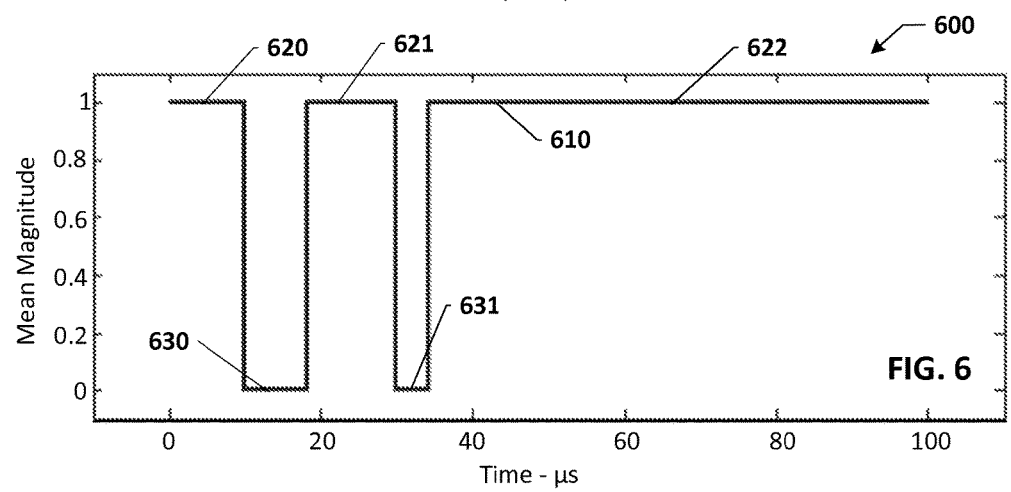
FIG. 6 is a plot of blanking look up table outputs as a function of time for a waveform, according to an embodiment.

FIG. 6, graph 600, illustrates a plot 610 indicating at which time(s) during generation of a waveform the LUT values presented in FIG. 5 are to be accessed and applied to the respective switches (e.g., switches 350 and 450) between the chirp generation logic (e.g., the frequency accumulator 102 and the phase accumulator 110) and the subsequent ROM components (e.g., sin ROM component 140 and cos ROM component 240). As illustrated, a mean signal magnitude of 1 can be utilized for the frequencies which are not restricted, e.g., during timing ranges indicated by 620, 621, and 622. Further, a mean signal magnitude of 0 can be utilized for the frequencies which are restricted, e.g., during the timing ranges indicated by regions 630 and 631.

Figure 7:
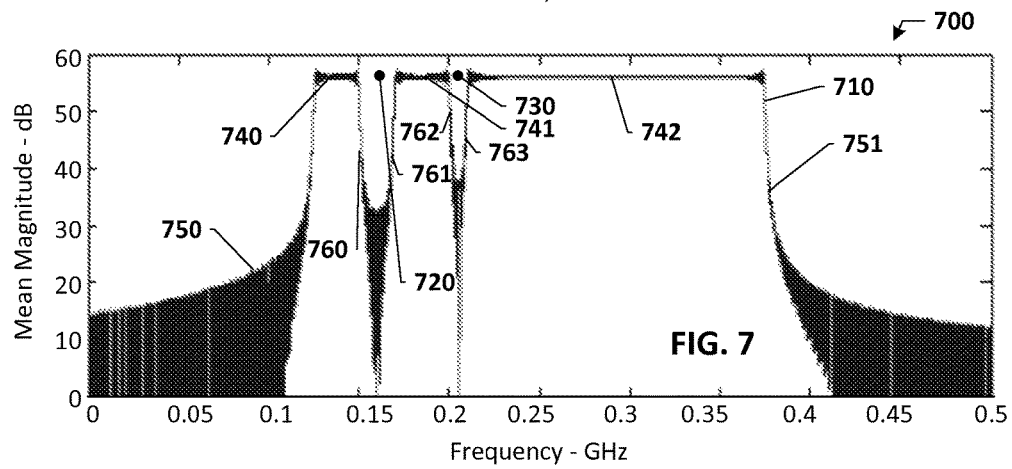
FIG. 7 is a LFM chirp spectrum including a plurality of spectral notches, according to an embodiment.

FIG. 7 presents a graph 700, which is a waveform representation as a function of frequency (GHz) and mean magnitude (decibels (dB)). A plot of a waveform 710 depicts a notched spectrum formed in accordance with the above presented frequency conditions. As shown, the profile of the waveform 710 includes two notched regions, a first notch 720 occurring between 150-170 MHz and a second notch occurring between 200-210 MHz. For the unrestricted frequency ranges 740, 741 and 742 the waveform 710 is generated with a magnitude of about 56 dB, while in the notched regions the signaling tends towards 0 dB. For the waveform 710, as with a spectrum of a notch-free LFM chirp, the slopes at the spectrum edges (e.g., slopes 750 and 751) can be a function of time-bandwidth product of the chirp. As a pulsewidth or bandwidth increases for a chirp, the respective edges of the waveform 710 (e.g., slopes 750 and 751) and notches (e.g., sidewalls 760-763) can become steeper, and the notches 720 and 730 can become deeper.

In an aspect, if increasing a time-bandwidth product of a chirp is impractical, in an alternate embodiment, whereby for example, a desired radar data includes multiple pulses, then the edges (e.g., sidewalls 760-763) of the notches 720 and 730 can be modulated to deepen a respective notch.

For example, in an embodiment, a band-edge of a desired notch can be dithered randomly from one pulse to the next in a plurality of pulses. FIG. 8 illustrates a graph 800 of frequency (GHz) versus LUT values depicting 10 pulses overlaid, plots 810-819. As shown, the 10 plots 810-819 are taken from the second notch region 730 of the waveform presented in FIG. 7. In the example depicted in FIG. 8, the dithering was applied in the form of a random adjustment of the width w of the notch (e.g., notch 730), with the adjustment limited to about ±0.1% of the sampling frequency. Accordingly, the width w was adjusted by about ±1 MHz, which equates to the edges of the notch being adjusted inward or outward by as much as about ±0.5 MHz. It is to be appreciated that the dithering adjustment values presented here are example values, and any values can be utilized to engender a dithering effect.

Figure 9:
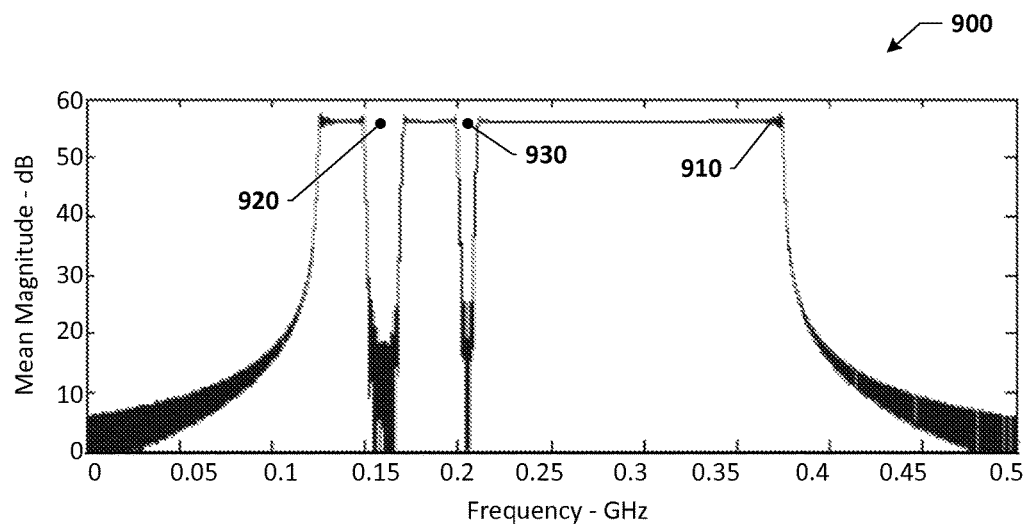
FIG. 9 is a mean LFM chirp spectrum of 1024 pulses including spectral notches formed by dithering, according to an embodiment.

FIG. 9 illustrates graph 900 presenting a mean spectrum waveform plotted as a function of frequency (GHz) and mean magnitude (dB). A waveform 910 can be generated using the previously described dithering technique. In this exemplary embodiment, the mean spectrum waveform 910 is generated from 1024 pulses. In comparison with the waveform 710, waveform 910 has a greater depth to the notches 920 and 930 at the frequency ranges 150-170 MHz and 200-210 MHz, which are comparable to the frequency notches 720 and 730. The dithering technique can be applied to any of systems 100-400. Further, the dithering technique can be applied even in an operation where the downstream analog signal is compressed, e.g., per an operation involving a microwave power amplifier.

In a further embodiment, it is possible to improve and/or increase a depth of a notch in a single pulse waveform. In the previously described embodiments, systems 100-400, the frequency dependent blanking LUT 130 effectively operates in a binary manner, whereby the signal 136 indicates that a respective switch (e.g., any of switches 150, 350, and/or 450) is to be switched to allow a signal to pass through the switch unmodified (e.g., the signal is in a frequency range that is allowed to be transmitted) or the signal is replaced (e.g., with a zero amplitude signal, a zero phase signal, a $\pi/2$ phase signal) to render the waveform to have a zero magnitude (e.g., for one or more restricted frequency ranges). Accordingly, the signal 136 can be considered to comprise of an 'off' state (e.g., signaling is unmodified) and an 'on' state (e.g., signaling is modified to zero magnitude).

However, rather than utilizing a transition from a first region of unrestricted frequency transmission to a region of restricted frequency transmission and then subsequently transitioning to a second region of unrestricted frequency transmission, in a signaling off-on-off mechanism, as previously described, an 'amplitude' indication can be utilized to generated a sampled continuum of values between '0' (e.g., no transmission) and '1' (e.g., unrestricted transmission).

Figure 10:
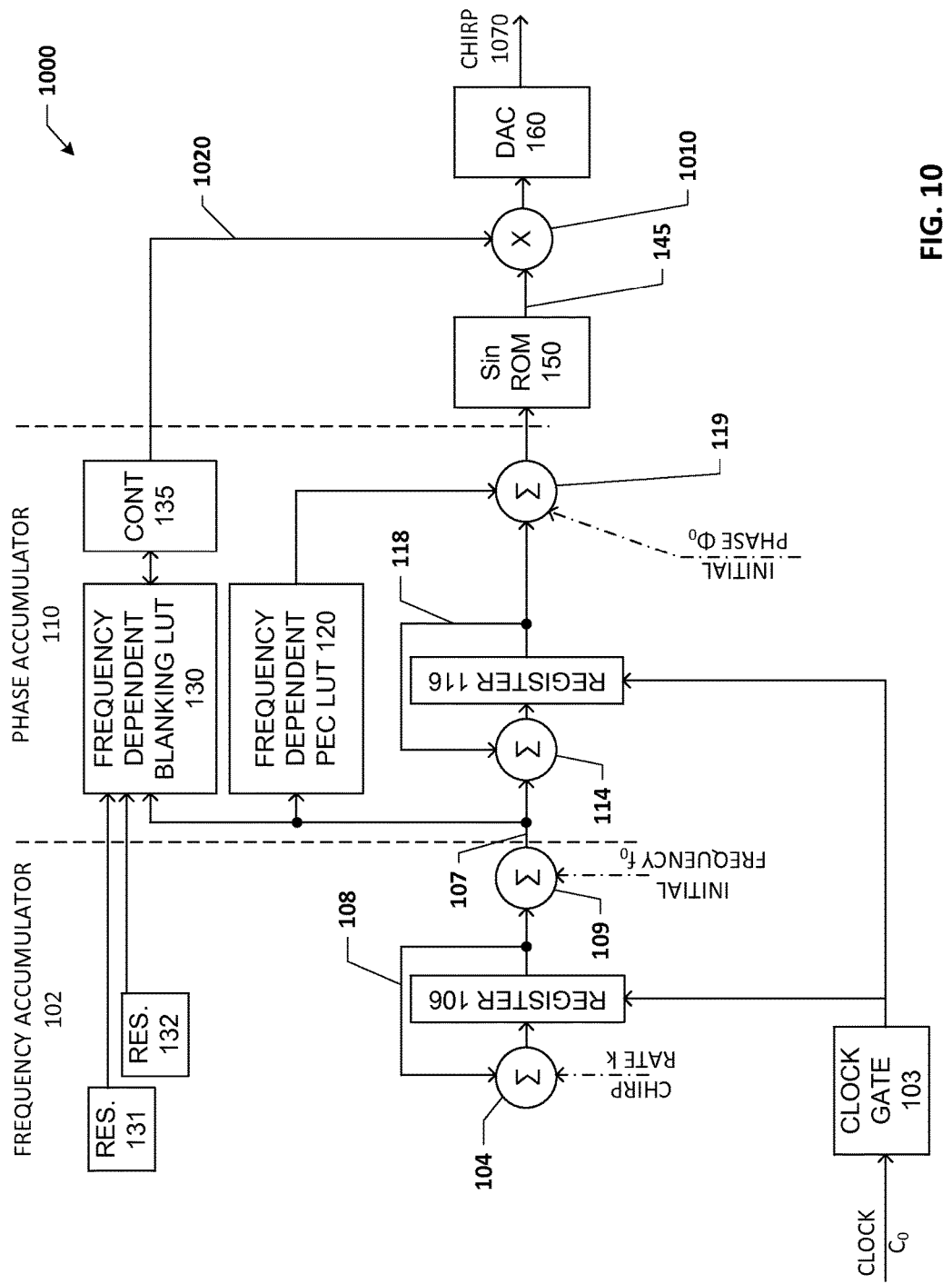
FIG. 10 illustrates a system for tapered notching of a frequency spectrum, according to an embodiment.

FIG. 10 illustrates a system 1000 which can be utilized to generate a signal which gradually transitions from a first signal magnitude (e.g., signal transmission) to a second signal magnitude (e.g., no signal transmission). System 1000 includes components which are common to system 100, as described earlier. In comparison with system 100, system 1000 includes a multiplier component 1010 located between the sin ROM component 150 and the DAC 160. As previously described, control component 135 can monitor an instantaneous frequency 107 and compare the instantaneous frequency 107 with one or more signaling frequencies stored in the frequency dependent blanking LUT 130. If an instantaneous frequency is not restricted then an instantaneous amplitude signal 145 generated by the sin ROM component 140 can be fed, unmodified, into the DAC 160. However, if an instantaneous frequency is restricted then the control component 135 can send a control signal 1020 such that the instantaneous amplitude signal 145 undergoes modification at the multiplier component 1010, prior to being fed into the DAC 160. In an embodiment the signal transition (e.g., from high magnitude signal to zero magnitude, and from zero magnitude signal to high magnitude signal) can be configured to occur over a particular distance of the sampling frequency. The multiplier component 1010 can operate in accordance with a transition factor. For example, the transition (per a transition factor) can be configured to occur over a distance of about 0.1% of the sampling frequency, over a distance of about 0.5% of the sampling frequency, over a distance of about 1.0% of the sampling frequency, etc.

It is to be appreciated that the values are presented as example values and any desired transition distance can be utilized.

Figure 11:
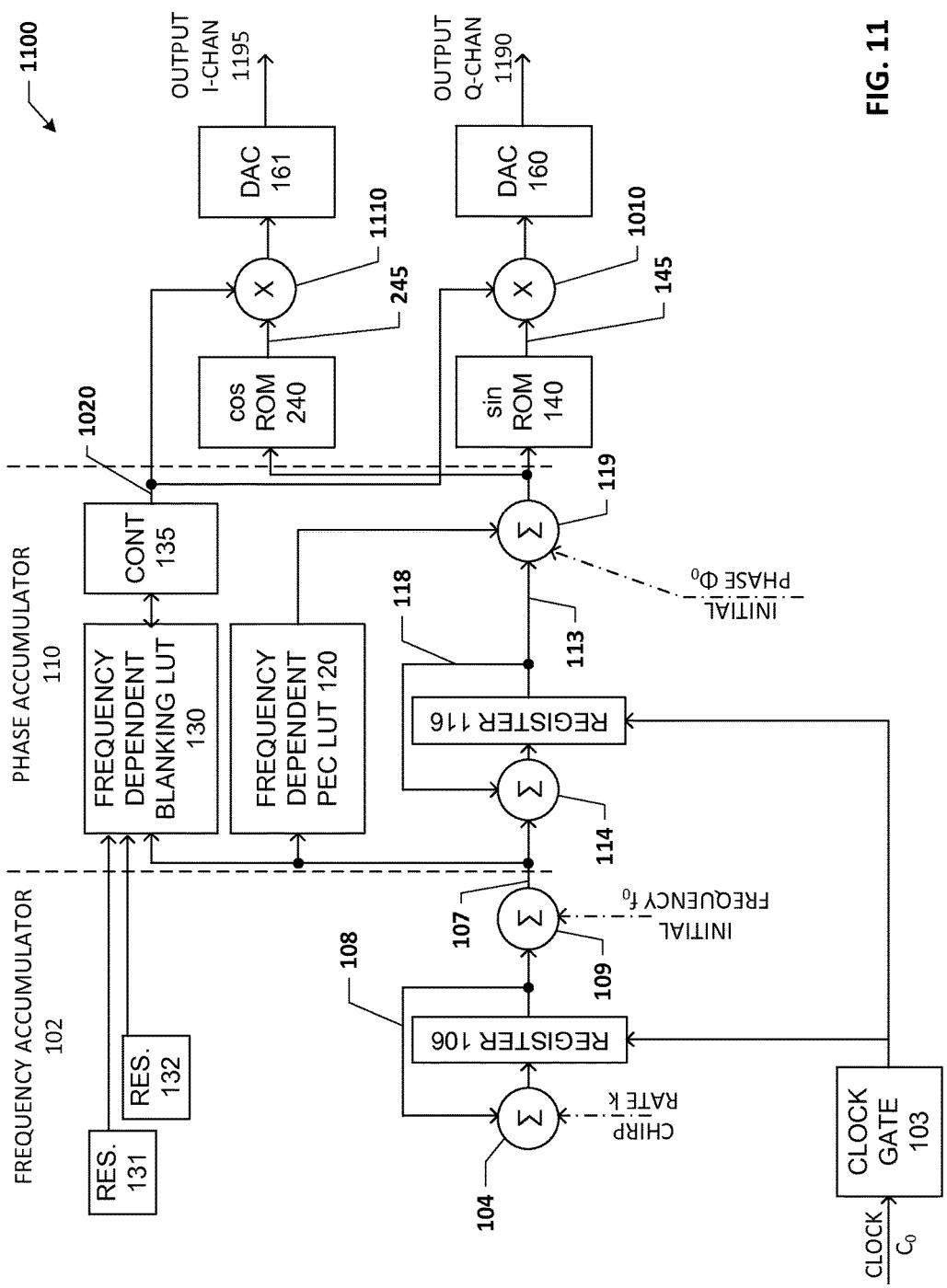
FIG. 11 illustrates a system for tapered notching of a frequency spectrum, according to an embodiment.

FIG. 11 illustrates a system 1100 which can be utilized to generate a signal which gradually transitions from a first signal magnitude (e.g., signal transmit) to a second signal magnitude (e.g., no signal transmission). System 1100 can be utilized to generate a quadrature WFS, whereby a quadrature WFS comprising the analog output Q-channel 1190 and/or analog output I-channel 1195.

System 1100 includes components which are common to system 200, as described earlier. In comparison with system 200, system 1100 includes a pair of multiplier components 1010 and 1110 respectively located between the sin ROM component 150 and a first DAC 160, and the cos ROM component 240 and a second DAC 161 (whereby the second DAC 161 is equivalent to a DAC 160). As previously described, control component 135 can monitor an instantaneous frequency 107 and compare the instantaneous frequency 107 with one or more signaling frequencies stored in the frequency dependent blanking LUT 130. If an instantaneous frequency is not restricted then instantaneous amplitude signals 145 and 245 respectively generated by the sin ROM component 140 and the cos ROM component 240 can be fed, unmodified, into the respective DAC's 160 and 161. However, if an instantaneous frequency is restricted then the control component 135 can send a control signal 1020 such that the instantaneous amplitude signal 145 undergoes modification at the multiplier component 1010, prior to being fed into the DAC 160. Further, if an instantaneous frequency is restricted then the control component 135 can also send a control signal 1020 such that the instantaneous amplitude signal 245 from the cos ROM component 240 undergoes modification at the multiplier component 1110, prior to being fed into the DAC 160. As mentioned with regard to FIG. 10, the signal transition can be configured to occur over a particular range of the sampling frequency.

It is to be appreciated that the switch components 150, 250, 350, and 450, and multiplier components 1010 and 1110 can be considered to be performing signal modification with respect to the respective signals being input into the respective switch component(s) and/or multiplier component(s), e.g., signals 117, 145, 245, etc. Accordingly, the switch components 150, 250, 350, and 450, and multiplier components 1010 and 1110 are also referred to herein as signal modifier components. Furthermore, the controller 135 can be utilized in the respective embodiments to switch or adjust operation of a signal modifier component from a first state (e.g., unmodified operation) to a second state (modified and/or transitioned operation).

Figure 12:
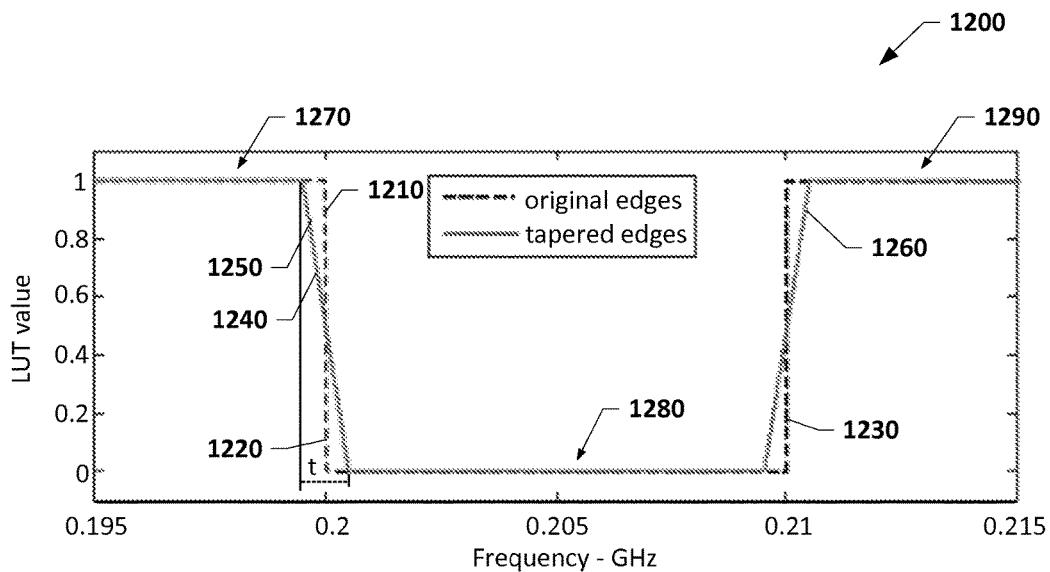
FIG. 12 is a plot of an original notch and a tapered notch, according to an embodiment.

FIG. 12 presents a graph 1200, showing a tapered edge plot and a non-tapered (original) plot as a function of frequency (GHz) versus LUT value. Two plots are presented, a non-tapered (original) plot 1210 which as shown, comprises vertically aligned sidewalls 1220 and 1230 to a notched region 1280 of zero magnitude signal formed between two regions 1270 and 1290 of high magnitude signal. Plot 1210 is similar to the plots shown in FIGS. 5 and 8, whereby the sidewalls 1220 and 1230 are vertical as the waveform is formed using a control operation of waveform modification 'on' to 'off', as previously described with reference to FIGS. 1-9. The tapered plot, plot 1240, has tapered (e.g., non-vertically aligned) sidewalls 1250 and 1260 to a notched region 1280 of zero magnitude signal formed between two regions 1270 and 1290 of high magnitude signal. Plot 1240 can be formed with either of systems 1000 and/or 1100. In the example shown, plot 1240 can be formed with a transition region setting t (aka a transition factor) of about 0.1% of the sampling frequency, or about 1 MHz. As shown in FIG. 12, the transition region setting t can be a gradual transition applied to frequencies adjacent to the frequency of sidewalls 1220 and 1230, whereby the transition region setting identifies the number of adjacent frequencies to undergo gradual transition.

Figure 13:
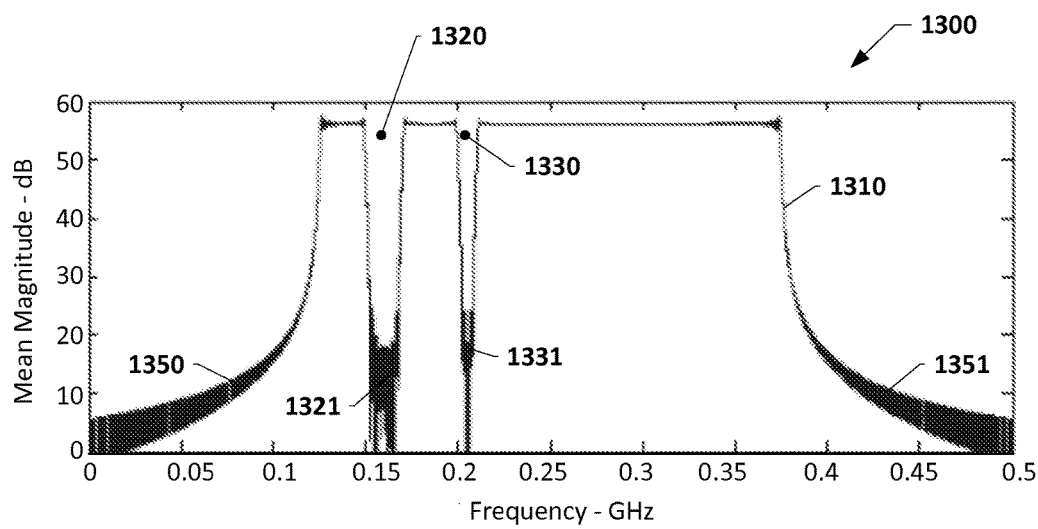
FIG. 13 is a LFM chirp spectrum including a plurality of spectral notches having tapered edges, according to an embodiment.

FIG. 13, is a graphical representation 1300 of a waveform as a function of frequency (GHz) versus mean magnitude (dB). Plot 1310 depicts a spectrum formed by utilizing signal transition regions, e.g., as described per plot 1240. Comparison of plot 1310 with plot 710 indicates the effect of the signal transitioning upon the notches 1320 and 1330 of plot 1300 compared with the notches 720 and 730 of plot 700, whereby the trough regions 1321 and 1331 of the respective notched regions 1320 and 1330 are of a lower magnitude dB value than for the troughs at the bottom of notches 720 and 730. Further, the side wall regions 1350 and 1351 of plot 1300 have a lower magnitude and range compared with the sidewalls 750 and 751 of plot 700.

In an aspect, for the spectrum of plot 1310 to be maintained between WFS output and transmitted signal, the analog signal channel should be strongly linear, such that the amplitude scaling is maintained. Owing to the spectrum of plot 1310 being based on amplitude scaling, any signal path amplitude compression, such as is often exhibited by many components including power amplifiers, can alter the amplitude scaling and thereby alter the spectrum characteristics. Accordingly, depending on the specific magnitude compression characteristics exhibited by various analog RF components in the signal path, and the specific notch-edge tapering employed, the notch characteristics might be either degraded or even improved in some cases. Hence, a notch tapering can be selected to enable tapering to specifically compensate for subsequent analog component linearity, and thus achieve a more precise transmitted spectrum.

As previously mentioned, the various systems 100-400, 1000, and 1100 presented herein can preserve phase linearity across the notch. A LFM chirp generator component, e.g., the phase generator comprising the frequency accumulator 102 and the phase accumulator 110, can be configured such that generation of a chirp waveform can continue to update as a background operation and unaware whether its output is being passed to a sin ROM component, a cos ROM component, and/or ultimately to a DAC or not. Each system is configured such that generation of an instantaneous frequency and/or instantaneous phase signals can occur prior to any modification or notching circuitry. Hence, the instantaneous frequency signals can be generated by the LFM chirp generator componentry without regard for any subsequent notching operation being performed.

Figure 14:
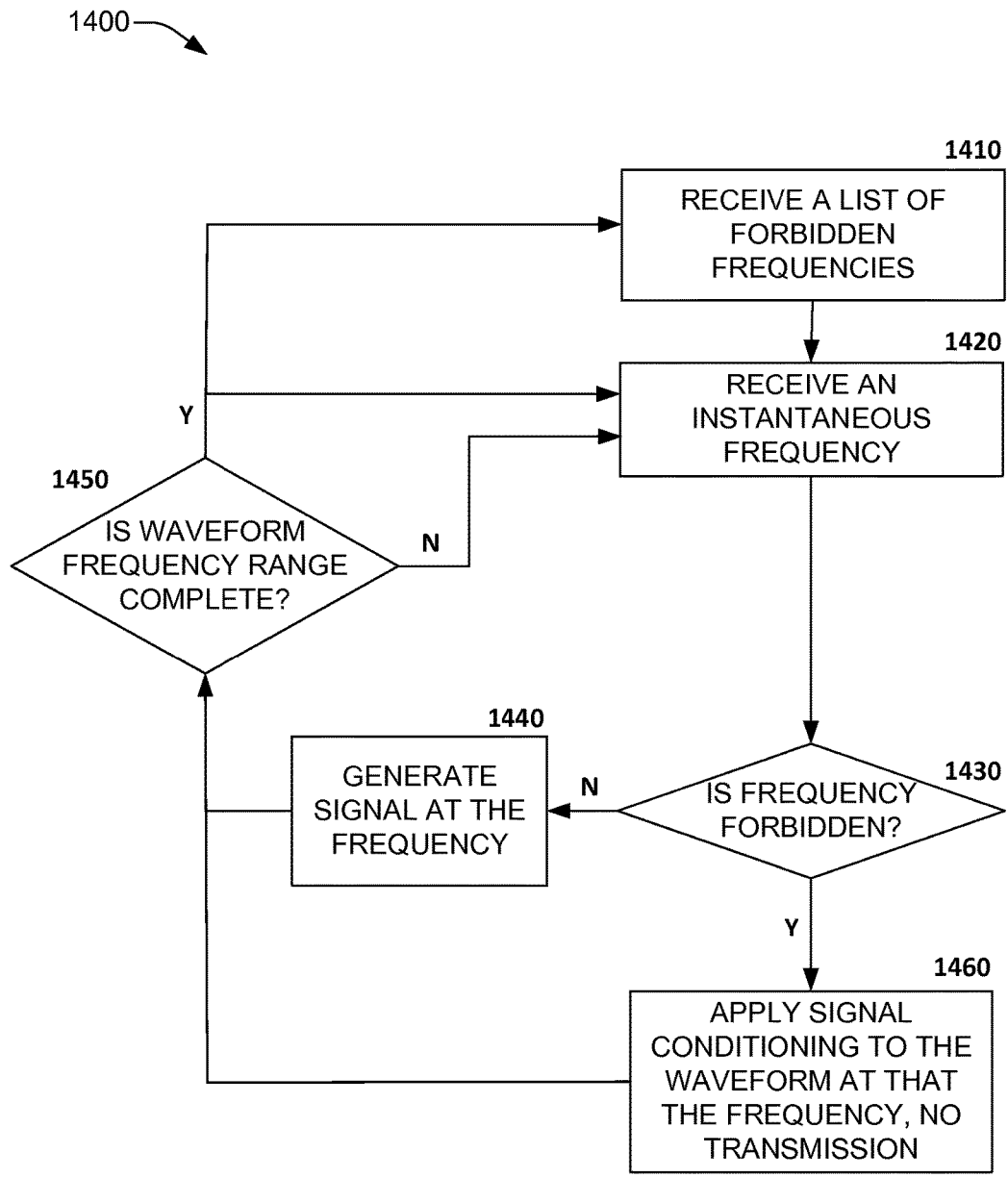
FIG. 14 is a flow diagram illustrating an exemplary methodology for applying a frequency notch in a radar waveform.
Figure 15:
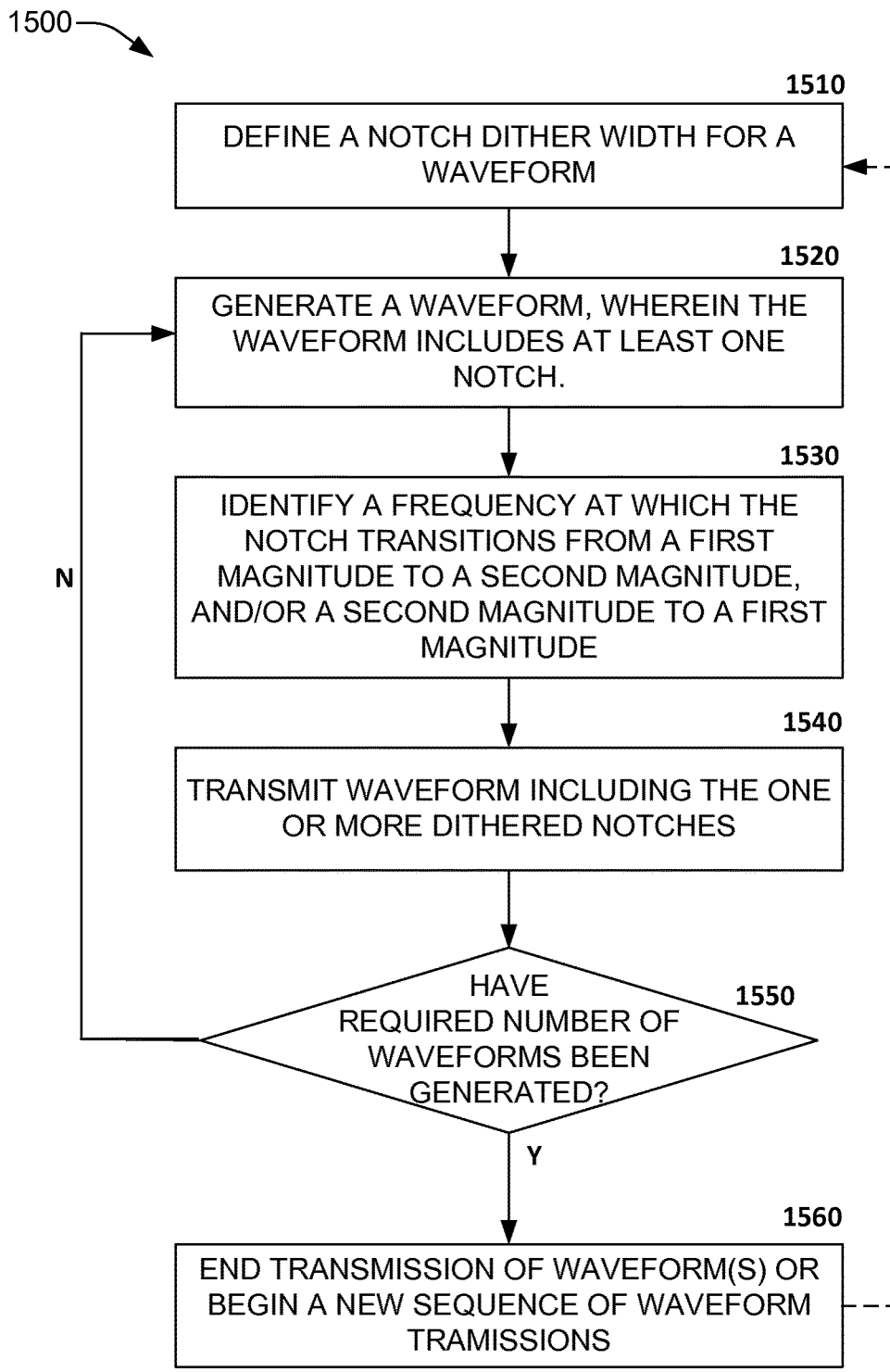
FIG. 15 is a flow diagram illustrating an exemplary methodology to apply frequency dithering for a notch in a radar waveform.
Figure 16:
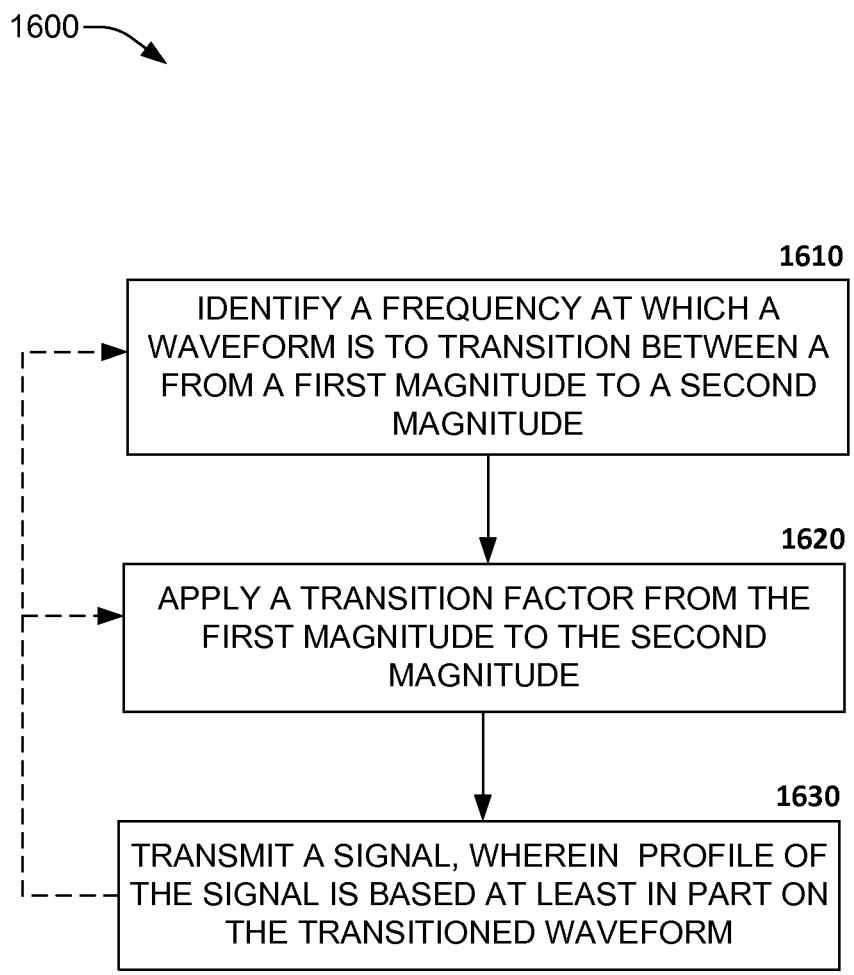
FIG. 16 is a flow diagram illustrating an exemplary methodology for applying gradual transition to a sidewall of a notch in a radar waveform.

FIGS. 14-16 illustrate exemplary methodologies relating to restricting radar transmission in accordance with restricted signaling requirements. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 14 illustrates a methodology 1400 relating to determining whether an instantaneous frequency has been designated as a restricted frequency, and based thereon, modifying a corresponding portion of waveform such that the instantaneous frequency is configured to have a different magnitude (e.g., of frequency, phase, or amplitude) than an instantaneous frequency that is not designated as restricted. At 1410, a frequency listing can be received, wherein one or more frequencies in the frequency listing are forbidden or restricted, and accordingly, no radar transmission should occur at these forbidden frequencies. As previously mentioned, the frequency listing can pertain to an entirety of operations for a radar system, or can pertain to a portion of an operation and the frequency listing is to be updated when the radar system is operating under new conditions, e.g., the radar system is to operate in a different airspace to the airspace in which the radar system is currently operating. The frequency listing can be stored in a frequency dependent blanking LUT.

At 1420, an instantaneous frequency can be obtained, whereby the instantaneous frequency can be generated by a frequency accumulator. The frequency accumulator can form a first part of a phase generator system whereby the second part of the phase generator can be a phase accumulator.

At 1430, a determination can be made as to whether the instantaneous frequency is included in the one or more forbidden frequencies identified in the frequency list. The determination can be performed by a control component. The control component can be configured to transmit a control signal indicating whether the instantaneous frequency is forbidden or not. The control component can be connected to a switch, as further described below.

At 1440, in response to a determination of NO the instantaneous frequency is not included in the one or more forbidden frequencies, the instantaneous frequency can be utilized in a radar signal. Accordingly, the control component can transmit the control signal to the switch indicating that the radar signal is to be generated for that frequency and a signal having a given magnitude or phase is to be passed through the switch unmodified. As previously described, depending upon a system configuration, the switch can be located at any of:

(a) between an output of a sin ROM component and an input of a DAC. In this configuration, a signal having an amplitude output from the sin ROM component can pass through the switch unmodified to the DAC.

(b) between an output of a cos ROM component and an input of a DAC. In this configuration, a signal having an instantaneous amplitude output from the cos ROM component can pass through the switch unmodified to the DAC.

(c) between an output of a phase accumulator component and an input of a sin ROM component. In this configuration, a signal having an instantaneous phase output from the phase accumulator component can pass through the switch unmodified to the sin ROM component.

(d) between an output of a phase accumulator component and an input of a cos ROM component. In this configuration, a signal having an instantaneous phase output from the phase accumulator component can pass through the switch unmodified to the cos ROM component.

Based upon any of the above described systems any of the signals based upon the instantaneous frequency, the instantaneous amplitude, or the instantaneous phase can be utilized in the generation of the radar signal.

At 1450, a determination can be made regarding whether the frequency range for the waveform is complete, e.g., have all instantaneous frequencies in the waveform been processed? In response to a determination that YES all of the frequencies in the frequency range have been processed, the flow can return to either of 1410, whereby a new frequency list can be received. Alternatively, the flow can return to generation of a subsequent waveform and reception of another instantaneous frequency for the waveform.

Returning to 1430, in response to a determination that YES the instantaneous frequency is included in the one or more forbidden frequencies, a modified signal is to be utilized for the waveform. Accordingly, the control component can transmit the control signal to the switch indicating a signal having a different magnitude or value (e.g., different to any of the instantaneous frequency, the instantaneous amplitude, or the instantaneous phase) is to be passed through the switch. Accordingly, at 1460, based upon the previously mentioned configurations, the following can occur in response to a control signal being generated by the control component and forwarded to the switch, whereby the control signal indicates waveform modification:

(a) where the switch is located between the output of a sin ROM component and the input of a DAC, the switch can be switched to a second input facilitating a signal of constant amplitude (e.g., zero amplitude) to be output from the switch as an input into to the DAC.

(b) where the switch is located between the output of a cos ROM component and the input of a DAC, the switch can be switched to a second input facilitating a signal of constant amplitude (e.g., zero amplitude) to be output from the switch as an input into to the DAC.

(c) where the switch is located between an output of a phase accumulator component and the input of a sin ROM component, the switch can be switched to a second input facilitating a signal of constant phase (e.g., zero phase, $\sin(0)=0$) to be output from the switch as an input to the sin ROM component.

(d) where the switch is located between an output of a phase accumulator component and the input of a cos ROM component, the switch can be switched to a second input facilitating a signal of constant phase (e.g., zero phase, $\cos(\pi/2)=0$) to be output from the switch as an input to the cos ROM component.

(e) where a multiplier component is being utilized (e.g., to replace a switch) at the output of a sin ROM component and/or a cos ROM component, such that a signal can be controlled to gradually transition from a first signal magnitude (e.g., signal transmission) to a second signal magnitude (e.g., no signal transmission), and vice versa.

Based upon any of the above described systems any of the modified frequency, the modified amplitude, or the modified phase can be utilized in the generation of the radar signal. Accordingly, the flow can continue to 1450 where a determination of 'waveform complete?' can be performed, as previously described.

FIG. 15 illustrates a methodology 1500 relating to applying a dither (or modulation) to a plurality of waveforms to facilitate obtaining a mean spectrum waveform. As previously described, dithering of a plurality of waveforms can enable a lower signal magnitude in one or more notches (e.g., in the notch troughs) respectively formed in each waveform.

At 1510, a plurality of parameters can be defined to facilitate one or more dithering operations. A notch dither width can be defined, whereby the notch dither width can identify a range over which a dither operation is to occur. Per the previous example, the notch dither width can be established based upon a sampling frequency of a waveform. For example, for a waveform having a sampling frequency of 1 GHz, a notch dither width of about ±0.1% of the sampling frequency can be defined, e.g., ±1 MHz. Accordingly, for a notch transition from a high state (e.g., '1') to a low state (e.g., '0') and vice versa, the actual frequency at which a notch transition can occur, per the example settings, can be about ±0.5 MHz (e.g., the frequency range over which a respective edge of a notch can be adjusted inward or outward). The plurality of parameters can be stored, and operated on, by a dither component, wherein the dither component can be communicatively coupled to a frequency dependent blanking look up table (LUT) and/or a control component. In an embodiment, the dither component can be configured to review a pre-existing waveform (e.g., as generated by a DAC) to identify notch transitions, and accordingly, the transition frequency at which the signal is to transition from a first magnitude to a second magnitude, or from the second magnitude to the first magnitude can be adjusted per the defined notch dither width. The dither component can be further communicatively coupled to a switch (e.g., via the control component) such that the dithering operation can be performed by dither component instructing when the frequency transition is to occur at the switch, via the control component.

At 1520, generation of a waveform can occur. In an aspect, a frequency spectrum for a waveform can be defined, e.g., 1 GHz. Further, based upon the restricted frequencies programmed into a frequency dependent blanking LUT, respective frequencies for which one or more notches are to occur can be identified by the dither component.

At 1530, one or more dither operations can be applied to the waveform. For example, a first undithered waveform is to transition from a high magnitude to a low magnitude at 0.2 GHz. A second waveform is to be dithered with the transition from the high magnitude to the low magnitude is to occur at 0.2005 GHz (e.g., +0.005 GHz about a mean frequency of 0.2 GHz). Further, a third waveform is to be dithered with the transition from the high magnitude to the low magnitude is to occur at 0.1995 GHz (e.g., −0.005 GHz about a mean frequency of 0.2 GHz). Accordingly, the average transition frequency for the three waveforms is 0.2 GHz, over a range of ±0.0005 GHz. In another embodiment, as a notch transition occurs during generation of a waveform, the notch transition can be adjusted in accordance with the notch dither width. Accordingly, the dither component can instruct a transition to occur for each waveform, whereby an instruction for transition at 0.2000 GHz for the first waveform, a transition at 0.2005 GHz for dithering the second waveform, and a transition at 0.1995 GHz for dithering the third waveform can be generated.

At 1540, the waveforms including the one or more dithered notches can be transmitted.

At 1550, a determination can be made as to whether the plurality of waveforms for which the dithering operation is to be applied have been transmitted. In response to a determination that NO not all of the waveforms have been transmitted, the flow can return to 1520 for another waveform to be generated. For example, a plurality of waveforms (e.g., 1024 waveforms) can be generated. In an embodiment, the notch dither width can be divided by the number of waveforms to be generated such that a mean frequency of the notch transition(s) is the same as if only one waveform was being generated.

Returning to 1550, in response to a determination that YES, the required number of waveforms have been transmitted, the flow can proceed to 1560. At 1560, the transmission of the required waveforms can end. Alternatively, if another sequence of waveforms are to be transmitted, the flow can return to 1510, as indicated by the hashed line.

FIG. 16 illustrates a methodology 1600 relating to applying a transition from a first signal magnitude (e.g., signal transmission) to a second signal magnitude (e.g., no signal transmission), or vice-versa. As previously described, applying a gradual transition to an edge of a notch can enable a lower signal magnitude to be achieved in a trough of a notch.

At 1610, a frequency at which a waveform transitions from a first signal magnitude (e.g., signal transmission) to a second signal magnitude (e.g., no signal transmission), or vice-versa, can be identified. Accordingly, as previously described, the frequency transition can correlate to a sidewall of a notch. In an embodiment, a transition from the first signal magnitude to the second signal magnitude can occur in such a manner that forming a frequency notch with a low (e.g., zero) magnitude can be difficult to achieve. However, if a gradual transition is applied from the first signal magnitude to the second signal magnitude across the frequencies in the transition range, a notch having a trough with a lower magnitude can be achieved. Accordingly, a transition in frequency can be defined (e.g., per a transition factor) such that a notch sidewall thereformed can have an angular profile (e.g., as shown in FIG. 12).

At 1620, the transition factor to facilitate achieving the sidewall having the gradual transition can be applied to a waveform comprising one or more notches and according sidewalls.

At 1630, the waveform with the gradual transition sidewalls can be transmitted. The flow can return to either of 1610, whereupon a different frequency transition can be defined, or 1620 whereupon a waveform can be modified with the defined frequency transition.

Figure 17:
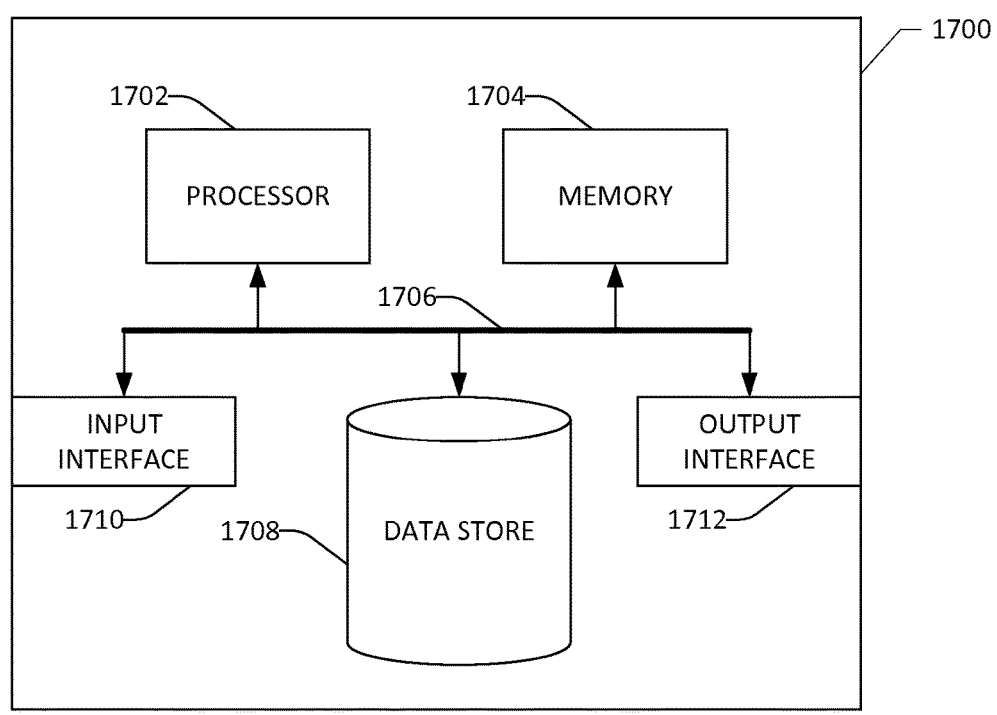
FIG. 17 illustrates an exemplary computing device.

Referring now to FIG. 17, a high-level illustration of an exemplary computing device 1700 that can be used in accordance with the systems and methodologies disclosed herein is illustrated. For instance, the computing device 1700 may be utilized to generate one or more notches in a waveform, whereby the one or more notches can coincide with one or more restricted frequencies. For example, computing device 1700 can operate as a control component 135 in conjunction with the frequency dependent blanking LUT 130. Alternatively, computing device 1700 can operate as a dither component 190. The computing device 1700 includes at least one processor 1702 that executes instructions that are stored in a memory 1704. The instructions may be, for instance, instructions for implementing functionality described as being carried out by one or more components discussed above or instructions for implementing one or more of the methods described above. The processor 1702 may access the memory 1704 by way of a system bus 1706. In addition to storing executable instructions, the memory 1704 may also store operating parameters, required operating parameters, and so forth.

The computing device 1700 additionally includes a data store 1708 that is accessible by the processor 1702 by way of the system bus 1706. The data store 1708 may include executable instructions, operating parameters, required operating parameters, etc. The computing device 1700 also includes an input interface 1710 that allows external devices to communicate with the computing device 1700. For instance, the input interface 1710 may be used to receive instructions from an external computer device, from a user, etc. The computing device 1700 also includes an output interface 1712 that interfaces the computing device 1700 with one or more external devices. For example, the computing device 1700 may display text, images, etc., by way of the output interface 1712.

Additionally, while illustrated as a single system, it is to be understood that the computing device 1700 may be a distributed system. Thus, for instance, several devices may be in communication by way of a network connection and may collectively perform tasks described as being performed by the computing device 1700.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
a computer-readable storage device that comprises a look up table (LUT), the LUT includes a list of frequencies including a non-restricted frequency and a restricted frequency, whereby the non-restricted frequency is to be included in a radar spectrum transmission, and the restricted frequency is not to be transmitted in the radar spectrum transmission;
a control component configured to:
determine, based upon the list of frequencies in the LUT, whether an instantaneous frequency is a non-restricted frequency or a restricted frequency, wherein the instantaneous frequency is a frequency in an instantaneous signal over which energy is to be transmitted at an instantaneous point in time; and
in response to determining the instantaneous frequency is a restricted frequency, transmit a first indicator that the instantaneous signal is to be modified;
a signal modifier component that is in communication with the control component and is configured to receive the first indicator, the signal modifier component comprises a first input and a second input, wherein:
when the signal modifier component is in a first position the signal modifier component is configured to pass a signal received at the first input of the signal modifier component therethrough; and
when the signal modifier component is in the first position and the signal modifier component receives the first indicator, the signal modifier component is configured to adjust to a second position, wherein at the second position the signal is replaced with a modified signal received at the second input of the signal modifier component; and
a multiplier component, wherein the multiplier component operates in conjunction with a transition factor, the transition factor controls where adjustment from the first position to the second position is to occur, the transition factor being based upon a sampling frequency of the radar spectrum transmission.

2. The system of claim 1, wherein:
the control component is further configured to:
in response to determining the instantaneous frequency is a non-restricted frequency, transmit a second indicator that the instantaneous signal is to pass through the signal modifier component; and
the signal modifier component is further configured to:
receive the second indicator; and
in response to receiving the second indicator, the signal modifier component is to remain in the first position.

3. The system of claim 1, wherein the modified signal is one of a zero amplitude signal, a zero phase signal, or a π/2 phase signal.

4. The system of claim 1, wherein the instantaneous signal received at the signal modifier component is one of an instantaneous phase or an instantaneous amplitude.

5. The system of claim 1, wherein the signal modifier component further comprises an output, the output of the signal modifier component is connected to one of a sin read-only-memory (ROM) component, a cos ROM component, or a digital-to-analog convertor (DAC).

6. The system of claim 1, wherein a radar spectrum in the radar spectrum transmission defines a band of frequencies to form a linear frequency modulated (LFM) chirp.

7. The system of claim 1, wherein the signal modifier component is a switch.

8. The system of claim 1, further comprising a dither component configured to apply a frequency dither to the modified signal.

9. A method, comprising:
monitoring a first instantaneous frequency of a waveform of a radar signal that is to be transmitted where the radar signal is not to be transmitted when having frequencies in a restricted frequency band;
determining that the first instantaneous frequency is included in the restricted frequency band, and where a first magnitude of the waveform at the first instantaneous frequency is greater than zero;
replacing a first portion of the waveform that has the first instantaneous frequency with a modified portion to generate a modified waveform, the modified waveform has a second magnitude that is less than the first magnitude;
monitoring a second instantaneous frequency of the waveform, wherein the second instantaneous frequency has an original magnitude greater than zero;
determining that the second instantaneous frequency is a frequency not included in the restricted frequency band and is indicated to be allowable, wherein the second instantaneous frequency has an original magnitude greater than zero; and
generating a radar waveform to include the modified portion and a second portion having the second instantaneous frequency, wherein a transition from the second magnitude of the modified portion to the original magnitude of the second instantaneous frequency forming a sidewall of a notch formed in the radar waveform, the sidewall having a vertical alignment, wherein the acts of monitoring, determining, replacing and generating are performed by a digital signal processor.

10. The method of claim 9, wherein the radar signal is a linear frequency modulated (LFM) chirp.

11. The method of claim 9, further comprising transmitting the radar signal, the radar signal comprising the radar waveform.

12. The method of claim 9, wherein the determining of the first instantaneous frequency having a restricted frequency being performed by a controller component, the controller component comparing the first instantaneous frequency with a frequency list stored in a look-up-table, the frequency list comprising the restricted frequency and an allowable frequency.

13. The method of claim 12, wherein a signal modifier component is utilized to replace the first portion of the first instantaneous frequency with the modified portion, the signal modifier component being controlled by the controller component.

14. The method of claim 13, wherein the signal modifier component is located between one of a sin read-only-memory (ROM) component and a digital to analog convertor (DAC), a cos ROM component and a DAC, a phase adder component and a sin read-only-memory (ROM) component, or a phase adder component and a cos read-only-memory (ROM) component.

15. The method of claim 9, further comprising applying a gradual transition to a plurality of frequencies adjacent to a frequency of the sidewall, the gradual transition causing the sidewall to have a non-vertical alignment.

16. A digital signal processor in a radar system, the digital signal processor programmed to perform acts, comprising:

monitoring a first instantaneous frequency in a frequency spectrum, wherein the first instantaneous frequency has a first magnitude, the first magnitude is greater than zero;

determining the first instantaneous frequency has a frequency indicated to be restricted and is not to be transmitted;

replacing a first signal generated from the first instantaneous frequency with a second signal, wherein the second signal has a second magnitude, the second magnitude is less than the first magnitude;

monitoring a second instantaneous frequency in the frequency spectrum, wherein the second instantaneous frequency has third magnitude, the third magnitude is greater than zero;

determining the second instantaneous frequency has a frequency indicated to be allowable;

generating a third signal, the third signal having a fourth magnitude based on the third magnitude; and generating a radar waveform to include the second signal and the third signal, wherein a transition from the second magnitude of the second signal to the fourth magnitude of the third signal forming a sidewall of a notch formed in the radar waveform, the sidewall having a vertical alignment.

17. The digital signal processor of claim 16, wherein the radar waveform is a linear frequency modulated (LFM) chirp waveform.

18. The digital signal processor of claim 17, the acts further comprising applying a gradual transition to a plurality of frequencies adjacent to a frequency of the sidewall, the gradual transition causing the sidewall to have a non-vertical alignment.

19. The digital signal processor of claim 16, the acts further comprising applying a dithering factor to adjust location of the sidewall of the notch, wherein the dithering factor is based upon a sampling frequency of the radar waveform.

20. The method of claim 9, further comprising outputting the modified waveform to a digital to analog converter.

* * * * *